United States Patent [19]

Tahara et al.

[11] 4,451,752
[45] May 29, 1984

[54] STATOR OF D.C. ROTARY MACHINE

[75] Inventors: Kazuo Tahara; Takayuki Matsui; Haruo Koharagi, all of Hitachi; Seizi Yamashita, Katsuta; Noriyoshi Takahashi, Hitachi, all of Japan

[73] Assignee: Hitachi, Ltd., Tokyo, Japan

[21] Appl. No.: 387,203

[22] Filed: Jun. 10, 1982

[30] Foreign Application Priority Data

Jun. 12, 1981 [JP] Japan .................. 56-89633

[51] Int. Cl.$^3$ ............................................. H02K 23/22
[52] U.S. Cl. .................... 310/186; 310/180; 310/183
[58] Field of Search .................... 310/180, 183, 186

[56] References Cited

U.S. PATENT DOCUMENTS

| 2,385,199 | 9/1945 | Fisher | 310/186 X |
| 3,201,626 | 8/1965 | Calabrese et al. | 310/186 |
| 3,263,147 | 7/1966 | Robinett | 310/186 X |

FOREIGN PATENT DOCUMENTS

| 2612976 | 10/1976 | Fed. Rep. of Germany | 310/180 |
| 160745 | 5/1964 | U.S.S.R. | 310/183 |

Primary Examiner—Donovan F. Duggan
Attorney, Agent, or Firm—Antonelli, Terry & Wands

[57] ABSTRACT

In a stator provided with interpoles, a magnetic flux adjusting winding is provided adjacent to the radially inner end of each interpole core for adjusting the magnetic flux passing through the half of the circumferential width of the interpole core, so that the intensity of the magnetic flux passing through the radially inner end of the interpole core becomes substantially uniform along the end face of the interpole core, whereby the waveform of the commutating emf is simulated to that of the reactance voltage to widen the width of the no-spark zone during commutation thereby improving the commutation performance without appreciably modifying the original shape or structure of the stator.

14 Claims, 21 Drawing Figures

STATOR OF D.C. ROTARY MACHINE

BACKGROUND OF THE INVENTION

This invention relates to a stator of a D.C. rotary machine, and more particularly to such a stator which is provided with interpoles producing interpole magnetic flux for generating a commutating electromotive force (emf) during commutation in which the direction of current flowing through the armature winding is reversed.

Briefly, a D.C. rotary machine is generally composed of a stator or a field structure, a rotor or an armature, and a commutation structure. The stator includes a yoke of annular shape, a plurality of main poles provided by winding main pole windings respectively around a plurality of main pole cores disposed along the inner peripheral face of the yoke in a relation circumferentially spaced apart by a predetermined distance from each other, and a plurality of interpoles provided by winding interpole windings respectively around a plurality of interpole cores disposed between the plural main poles. The rotor includes an armature core or a rotor core fixedly mounted on a rotary shaft, and an armature winding received in many slots formed in the outer periphery of the rotor core. The commutation structure includes a commutator fixedly mounted on the rotary shaft, and brushes disposed on the stator side to make slidable contact with the commutator segments for performing the commutation in cooperation with the commutator. The main magnetic flux produced from the main poles is directed toward the armature, and the interpole magnetic flux produced from the interpoles for generating the commutating emf during commutation, in which reversal of the armature current occurs, is also directed toward the armature.

This interpole magnetic flux is effective to a certain extent for compensating the non-uniformity of the main magnetic flux distribution attributable to the armature reaction and also to the relative polarities of the main poles and interpoles. Actually, however, the magnetic flux distribution around the interpole is frequently unsymmetrical with respect to the circumferential center of the interpole. This means that the waveform of the reactance voltage $e_r$ (when the commutation is assumed to be straightline commutation) does not frequently coincide with that of the commutating emf $e_c$. When the D.C. rotary machine is a motor, the relation $e_r < e_c$ holds between the reactance voltage $e_r$ and the commutating emf $e_c$ on the commutation starting side of the commutation structure, and, conversely, the relation $e_r > e_c$ holds on the commutation ending side of the commutation structure. It is therefore necessary to compensate the reactance voltage $e_r$ on either the commutation starting side or the commutation ending side of the commutation structure, and it is a common practice to regulate the intensity of the interpole magnetic flux so that the relation $e_r = e_c$ holds on the commutation ending side of the commutation structure. As a result, the commutating emf $e_c$ tends to excessively increase on the commutation starting side until overcommutation occurs, and this is undesirable from the aspect of satisfactory commutation since commutation sparks tend to generate on the inlet side of the brushes. Further, when two or more coil sides are disposed in the same slot of the armature, the value of the commutating emf induced in one of the coils will differ from that induced in another, and the commutation compensating condition for the former coil will differ from that of the latter. Consequently, the prior art stator structure has been defective in that the overlapping area of the no-spark zones of the individual coils is narrowed thereby reducing or degrading the commutation performance.

SUMMARY OF THE INVENTION

With a view to obviate the prior art defect pointed out above, it is a primary object of the present invention to provide an improved stator of a D.C. rotary machine, which can operate with satisfactory commutation performance without requiring any great modification of its original structure.

The present invention which attains the above object is featured by the fact that magnetic flux adjusting means is provided adjacent to the radially inner end of the core of the interpole for adjusting the magnetic flux passing through the half of the circumferential width of interpole core, so that the intensity of the magnetic flux passing through the radially inner end of the interpole core becomes substantially uniform along the end face of the interpole core.

DESCRIPTION OF THE PREFERRED EMBODIMENTS

Preferred embodiments of the stator according to the present invention will now be described in detail with reference to the drawings.

Figure 1:
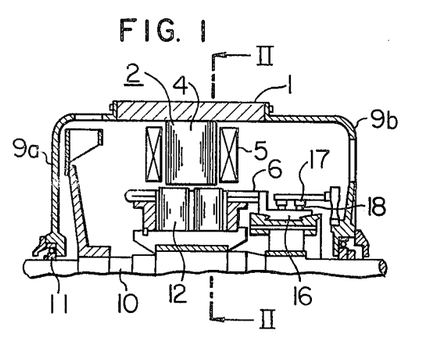
FIG. 1 is a longitudinally sectional, side elevation view of part of a D.C. rotary machine provided with a preferred embodiment of the stator according to the present invention.
Figure 2:
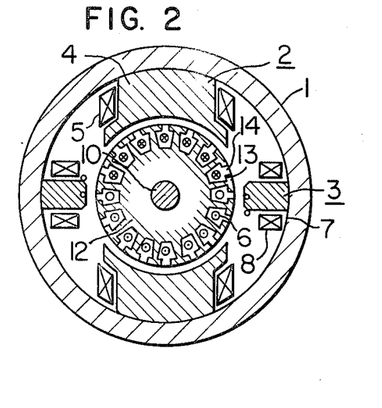
FIG. 2 is a sectional view taken along the line A—A in FIG. 1.

FIGS. 1 and 2 show the structure of a D.C. motor to which the present invention is applied. Referring to FIGS. 1 and 2, a plurality of main pole iron cores 4 and interpole iron cores 7 are securely fixed to the inner peripheral face of an iron yoke 1 of annular shape. A main pole winding 5 is wound around each of the main pole cores 4 to constitute main poles 2, and an interpole winding 8 is wound around each of the interpole cores 7 to constitute interpoles 3. End brackets 9a and 9b are mounted to respectively close the both end openings of the annular yoke 1. The elements above described constitute the principal parts of the stator.

The rotor (armature) rotatable relative to the stator includes a rotary shaft 10 rotatably supported in the end brackets 9a and 9b by bearings 11, and an armature core 12 fixedly mounted on this shaft 10. The armature core 12 is formed at its outer periphery with many teeth 13 and slots 14. An armature winding 6 is received in each of the slots 14, and a commutator 16 is fixedly mounted on the shaft 10 adjacent to the armature core 12. The elements above described constitute the rotor or armature.

The member designated by the reference numeral 17 in FIG. 1 is a brush holder mounted on the end bracket 9b to hold brushes 18 in a position capable of making sliding contact with the segments of the commutator 16.

In the D.C. motor having the construction described above, electric power is supplied from an external source to the armature windings 6 through the brushes 18 and commutator 16, and an exciting current is supplied to the main pole windings 5 to generate main magnetic flux therefrom. A motor driving force is generated by the interaction of the main magnetic flux and the current flowing through the armature windings 6. In this case, the direction of the current flowing through the armature winding 6 is reversed in the period of commutation by the brush 18, that is, until the short-circuiting between the commutator segments, to which a portion of the armature winding 6 is connected, is completed after the commutator segments start to be short-circuited by the brush 18. The product of the current variation rate di/dt at this time and the inductance L of the commutation coils short-circuited by the brush 18 provides the reactance voltage $e_r$. As described already, intense sparks are generated from the portion of the brush 18 making sliding contact with the commutator 16 when the value of this reactance voltage $e_r$ exceeds the critical sparking voltage.

The interpole 3 constituted by the interpole core 7 and the interpole winding 8 is provided for the purpose of compensating this reactance voltage $e_r$. However, as also described already, the interpole magnetic flux distribution is not symmetrical on the both sides of the center of the interpole 3 in the commutation period due to the leakage of the main magnetic flux and also due to the armature reaction, and it is difficult to satisfactorily compensate this reactance voltage $e_r$.

In a first preferred embodiment of the present invention which obviates the above difficulty, magnetic flux adjusting means is provided adjacent to the radially inner end of the interpole core 7 for adjusting the magnetic flux passing through the half of the circumferential width of the interpole core 7, so that the intensity of the magnetic flux passing through the radially inner end of the interpole core 7 becomes substantially uniform along the end face of the interpole core 7.

Figure 3:
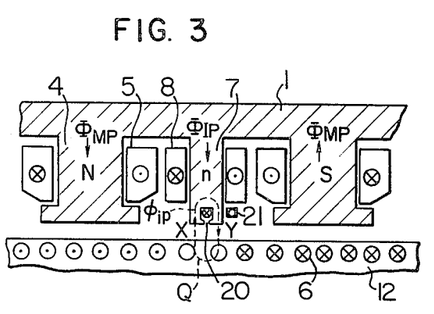
FIG. 3 is a sectional view showing, in developed fashion, the relation between the rotor and the stator according to the first embodiment of the present invention.
Figure 4:
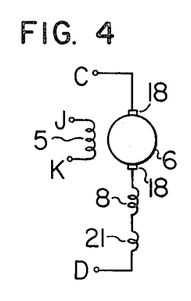
FIGS. 4, 5, 6, 7 and 8 are connection diagrams showing various forms of the interpole compensation winding provided according to the present invention.

Thus, as shown in FIG. 3, an axially extending slot 20 is provided in the circumferentially middle portion of the gap-side end or radially inner end of the interpole core 7, and an outwardly insulated conductor is inserted into this slot 20 to provide an interpole compensation winding 21. This winding 21 is so wound, as shown in FIG. 3, as to surround the right-hand side face of the slot 20 and the right-hand side face of the interpole core 7, and an exciting current is supplied to this interpole compensation winding 21 to energize the magnetic flux adjusting means.

Figure 5:
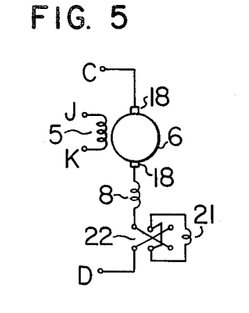
Figure 6:
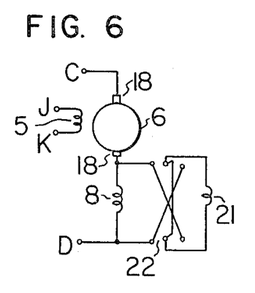
Figure 7:
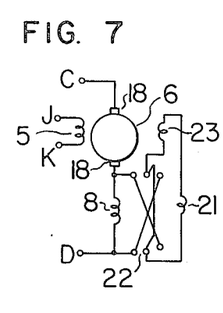
Figure 8:
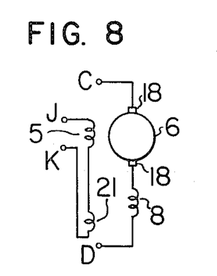

This interpole compensation winding 21 may be arranged in various forms as shown in FIGS. 4 to 8 to receive the exciting current. In the form shown in FIG. 4, the interpole compensation winding 21 is connected in series with the armature winding 6 and interpole winding 8 so as to derive the exciting current from the current flowing through the interpole winding 8. When the motor is a reversible one, the form shown in FIG. 5 is preferably employed. In the form shown in FIG. 5, a polarity switching device 22 is provided for switching the polarity of the interpole compensation winding 21, and the interpole compensation winding 21 is connected through this polarity switching device 22 to the interpole winding 8 to derive the exciting current therefrom. This polarity switching device 22 may be a contactor or a semiconductor switching circuit. In the form shown in FIG. 6, the interpole compensation winding 21 is connected in parallel with the interpole winding 8 through a polarity switching device 22 as described above. In the form shown in FIG. 7 illustrating an application to a motor provided with a shunt field winding 23, the interpole compensation winding 21 is connected in series with the shunt field winding 23 and in parallel with the interpole winding 8 through a polarity switching device 22 so as to derive the exciting current. In the form shown in FIG. 8, the interpole compensation winding 21 is connected in series with the main pole winding 5 to derive the exciting current from the current flowing through the main pole winding 5.

Whether the value of current is to be increased or the number of turns is to be increased to provide the required magnetomotive force generated from the interpole compensation winding is dependent upon the mode of connection in practical applications.

The function of the stator structure according to the first embodiment of the present invention will now be described.

Figure 9:
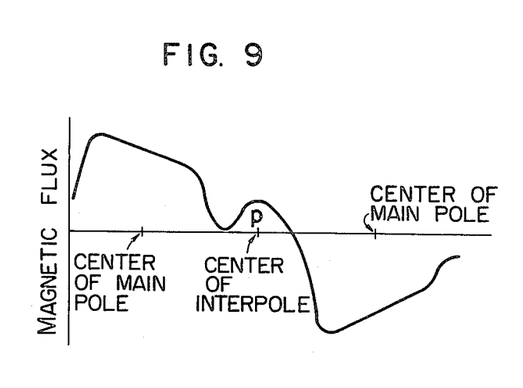
FIG. 9 is a curve showing the magnetic flux distribution in the stator embodying the present invention.
Figure 10:
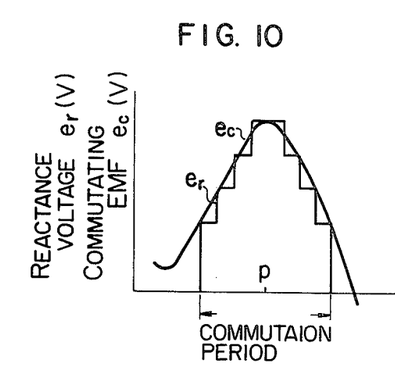
FIG. 10 is a graph showing the relation between the reactance voltage and the commutating emf in the embodiment of the present invention.

Referring to FIG. 3 again, the flow of the exciting current through the interpole compensation winding 21 in the direction as illustrated produces magnetomotive force which produces closed-loop interpole compensation magnetic flux $\phi_{ip}$ in the direction as shown by the broken line Q. This magnetic flux $\phi_{ip}$ overlaps on one hand and cancels on the other hand the interpole magnetic flux $\Phi_{IP}$ produced by the magnetomotive force of the interpole winding 8. Thus, in the interpole core 7 circumferentially partly split into portions X and Y by the axially extending slot 20, the magnetic flux in the portion X is given by $\Phi_{IP}-\phi_{ip}$, while that in the portion Y is given by $\Phi_{IP}+\phi_{ip}$. Consequently, the magnetic flux distribution around the interpole 3 can be made substantially symmetrical with respect to the circumferential center point P of the interpole core 7 as shown in FIG. 9, so that the waveform of the commutating emf $e_c$ can be simulated to that of the reactance voltage $e_r$ in the period of commutation as shown in FIG. 10. Therefore, the level of the reactance voltage $e_r$ on the commutation starting side and commutation ending side of the commutation structure can substantially coincide with that of the commutating emf $e_c$, and the adverse effect due to the generation of commutation sparks on the brush inlet side (the commutation starting side) can be removed. Further, due to the substantial coincidence between the reactance voltage $e_r$ and the commutating emf $e_c$ in the individual coils received in the same slot, the no-spark zone on the brush outlet side (the commutation ending side) can also be widened.

It will thus be seen that the provision of the magnetic flux adjusting means adjacent to the radially inner end of the interpole core 7 for adjusting the magnetic flux passing through the interpole core 7 is effective for the desired improvement in the commutation performance.

Figure 11:
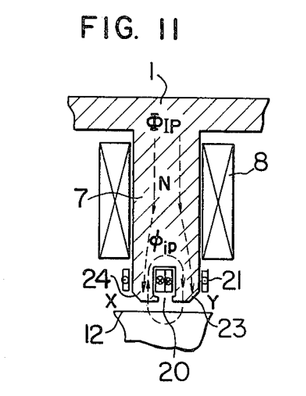
FIG. 11 is a sectional view of the interpole and associated parts in a second preferred embodiment of the stator according to the present invention.
Figure 12:
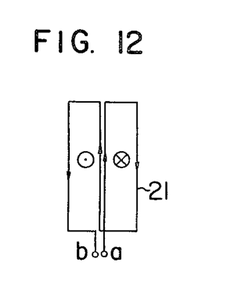
FIG. 12 is a winding diagram of the interpole compensation windings in the second embodiment shown in FIG. 11.

While the above description has referred to the provision of an interpole compensation winding 21 adjacent to the interpole 3 to illustrate an example of the magnetic flux adjusting means, the present invention in no way limits the magnetic flux adjusting means to the form shown in FIG. 3. For example, the magnetic flux adjusting means may be as shown in FIGS. 11 and 12. Referring to FIG. 11 showing a second embodiment of the present invention, a pair of such interpole compensation windings 21 respectively surround the circumferentially left-hand and right-hand side faces of the slot 20 formed in the radially inner end of the interpole core 7 and the circumferentially faces left-hand and right-hand side faced of the interpole core 7. That is, the interpole compensation windings 21 surround both of the teeth 23 and 24 formed on the interpole core 7. Such a modification exhibits also the effect similar to that exhibited by the first embodiment, and is advantageous in that the magnetic flux functions effectively without its leakage beyond the right-hand and left-hand side faces of the interpole core 7. In this modification, it is needless to mention that the interpole compensation windings 21 are wound as shown in FIG. 12 so that the directions of magnetic flux produced in the teeth 23 and 24 by the interpole compensation windings 21 are different from each other.

Figure 13:
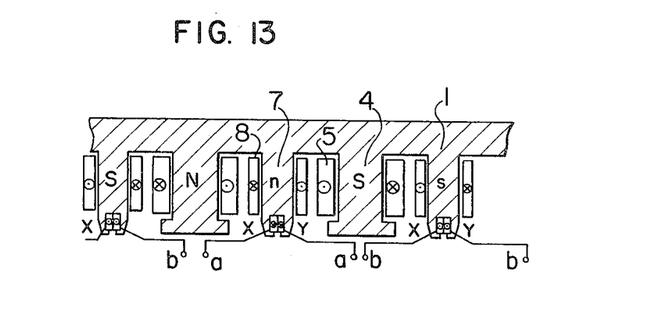
FIG. 13 is a sectional view showing, in developed fashion, part of a third preferred embodiment of the stator according to the present invention.

FIG. 13 shows a third embodiment of the present invention or a modification of the second embodiment shown in FIG. 11. In this third embodiment, an interpole compensation winding 21 is extended between the respective slots 20 of adjacent interpole cores 7 of opposite polarities. The effect exhibited by this third embodiment is also similar to that exhibited by the second embodiment.

In a D.C. rotary machine of large size, it happens sometimes that the no-spark zone appearing at the highest rotation speed differs from that appearing at the base rotation speed.

Figure 14:
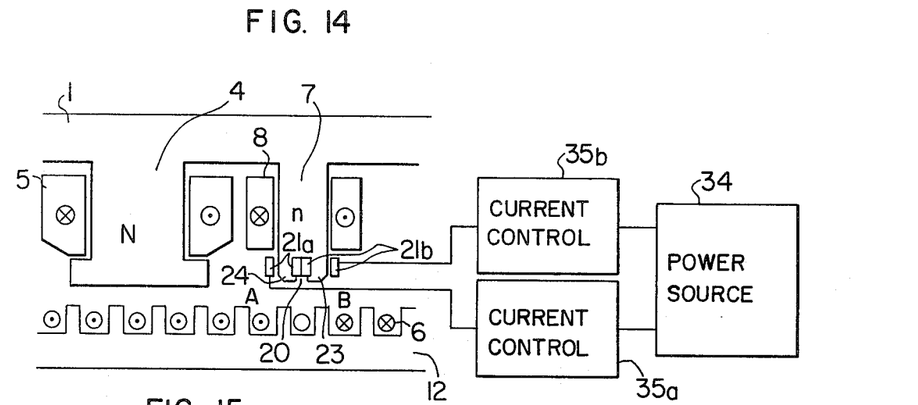
FIG. 14 is a developed view of part of a fourth preferred embodiment of the stator according to the present invention.
Figure 15:
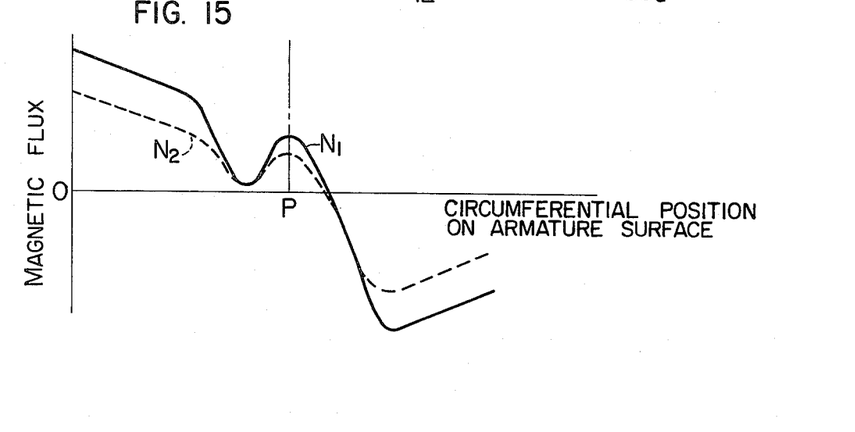
FIG. 15 is a graph showing the magnetic flux distribution at the circumferential positions on the surface of the armature in the D.C. rotary machine including the stator shown in FIG. 14.
Figure 16:
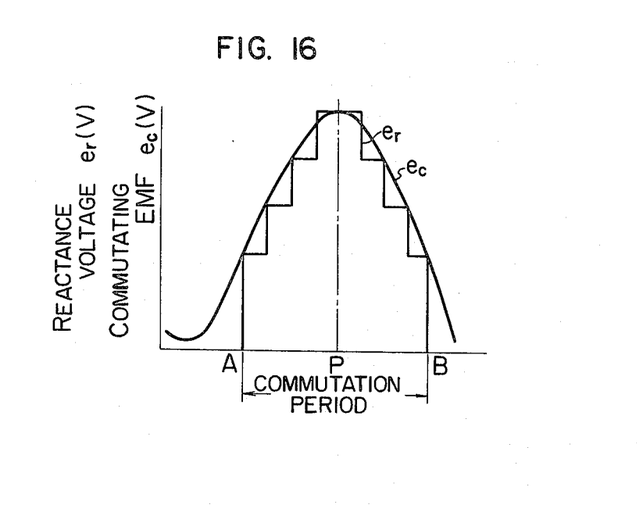
FIG. 16 is a graph showing similarly the relation between the reactance voltage and the commutating emf generated in the D.C. rotary machine during commutation.

In such a rotary machine, a fourth embodiment of the present invention shown in FIG. 14 is preferably employed. Referring to FIG. 14, independent interpole compensation windings 21a and 21b are wound around the teeth 24 and 23 formed at the radially inner end of the interpole core 7 respectively, and a power source 34 is connected through current control units 35a and 35b to the interpole compensation windings 21a and 21b respectively to supply a controlled current so that each of the interpole compensation windings 21a and 21b can generate the magnetomotive force providing the commutating emf $e_c$ which corresponds substantially to the waveform of the reactance voltage $e_r$ of the commutation coils in the commutation period. More precisely, the magnetomotive force of the interpole compensation winding 21a disposed on the commutation starting side (shown by A) is selected to be small, and that of the interpole compensation winding 21b disposed on the commutation ending side (shown by B) is selected to be large, so that the amount of magnetic flux produced at the highest rotation speed $N_2$ (shown by the broken curve) differs from that at the base rotation speed $N_1$ (shown by the solid curve) and the circumferential magnetic flux distribution is substantially symmetrical with respect to the circumferential center point P of the interpole core 7, as shown in FIG. 15. Thus, as shown in FIG. 16, the waveform of the commutating emf $e_c$ in the commutation period can always substantially coincide with that of the reactance voltage $e_r$ of the commutation coils at any load level (the armature current) and at any rotation speed.

As described above, the value of the exciting current supplied to the interpole compensation winding 21b differs from that supplied to the interpole compensation winding 21a, and it is necessary to decrease these current values with the increase in the rotation speed of the rotary machine so as to compensate for migration of the no-spark zone.

Figure 17:
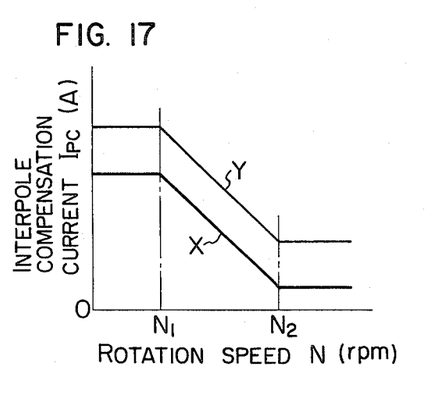
FIG. 17 is a graph showing, by way of example, patterns of a function of the interpole compensation current relative to the rotation speed of the D.C. rotary machine.
Figure 18:
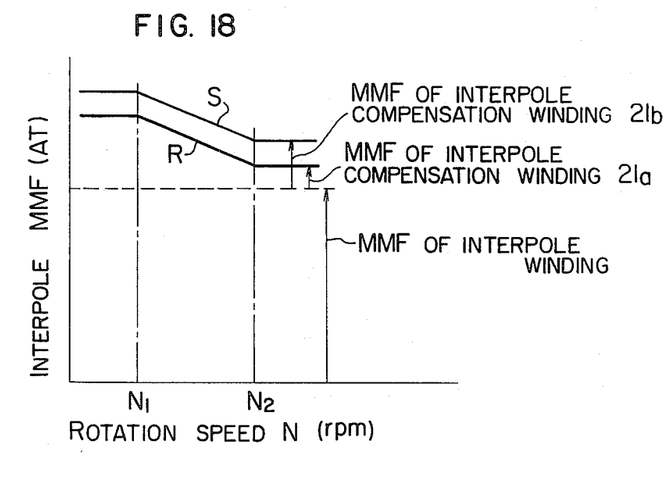
FIG. 18 is a graph showing, by way of example, variations of the interpole magnetomotive force relative to the rotation speed of the D.C. rotary machine.

For example, the values of the compensation current $I_{pc}$ supplied to the interpole compensation windings 21a and 21b are varied relative to the rotation speed N as a function of the rotation speed N or according to patterns X and Y respectively as shown in FIG. 17. (In this case, the armature current is assumed to be constant.) FIG. 18 shows the total magnetomotive force generated from the interpole 3 in such a case. It will be seen in FIG. 18 that the sum of the magnetomotive force of the interpole winding 8 and the magnetomotive force of each of the interpole compensation windings 21a and 21b is represented by a pattern R on the commutation starting side (the side A) and by a pattern S on the commutation ending side (the side B). Thus, the undesirable non-uniformity of the magnetic flux distribution can be minimized on each of the sides A and B, and the migration of the no-spark zone due to the variation of the rotation speed can be completely compensated.

When it is merely desired to obtain a magnetic flux distribution as shown in FIG. 15, the current $I_{pc}$ of the values varying as the function of the rotation speed N or according to the patterns X and Y shown in FIG. 17 is supplied to the interpole compensation windings 21a and 21b respectively. However, when the D.C. rotary machine is to be rotated in the normal and reverse directions or the regenerative braking or dynamic braking is to be applied to the D.C. rotary machine, it is necessary to correspondingly change over the patterns X and Y of the compensation current $I_{pc}$ supplied to the interpole compensation windings 21a and 21b, that is, to change over the function related to the rotation speed.

A practical current control circuit provided with such change-over means for controlling the compensation current $I_{pc}$ supplied to the interpole compensation windings 21a and 21b will now be described.

There are various methods for varying the magnetomative forces of the interpole compensation windings 21a and 21b. For example, the number of turns of each of the windings 21a and 21b may be varied by changing over the tap position. However, as described already, such a method is difficult to satisfactorily adjust the magnetomotive force in a rotary machine in which the direction of rotation is frequently reversed or the regenerative braking or dynamic braking is frequently applied.

Figure 19:
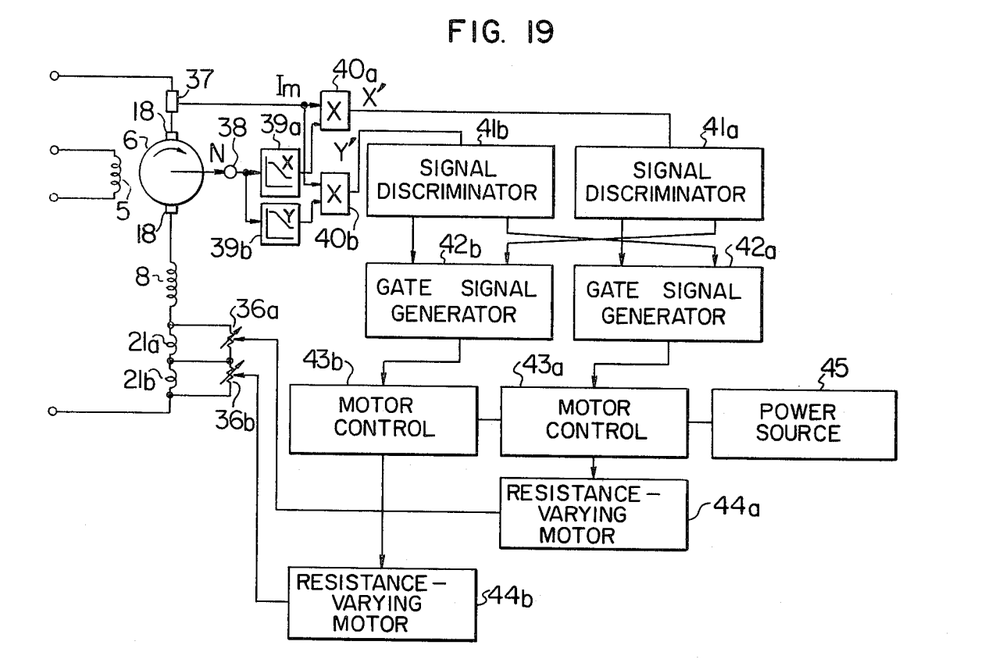
FIGS. 19 and 20 are block diagrams of two forms of the current control circuit controlling the current supplied to the interpole compensation windings employed in the embodiment of the present invention shown in FIG. 14.
Figure 20:
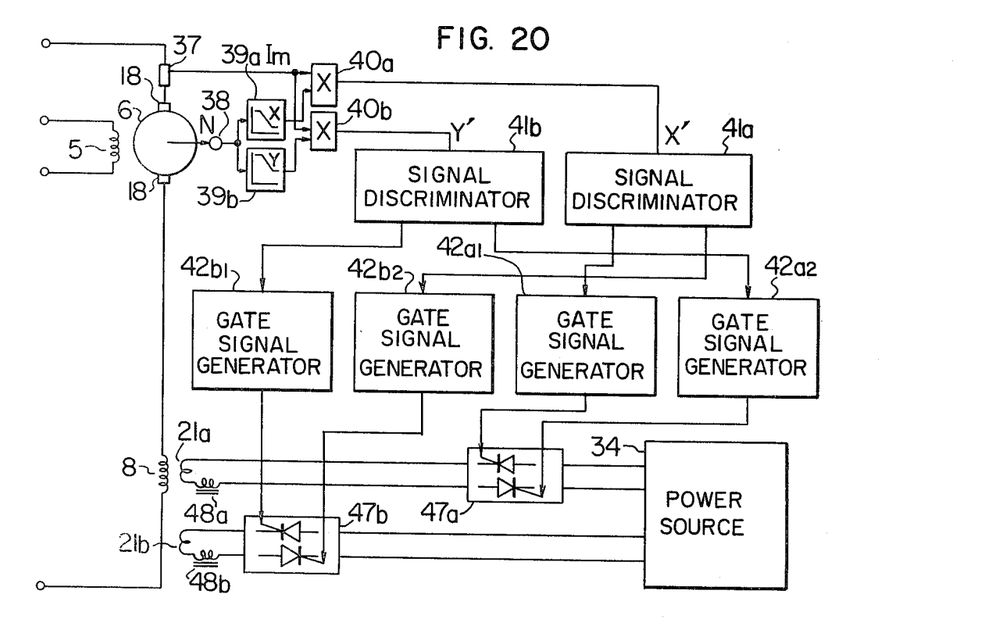

Therefore, the present invention employs a practical circuit structure as shown in FIG. 19 or 20.

In the circuit shown in FIG. 19 applied to the embodiment shown in FIG. 14, the interpole compensation windings 21a and 21b are connected in series with each other in the armature circuit, and current-regulating shunt resistors 36a and 36b are connected in parallel with these interpole compensation windings 21a and 21b respectively. The current control circuit includes a current detector 37, a rotation detector 38, function generators 39a and 39b for generating pattern outputs X and Y respectively, multipliers 40a and 40b, signal discriminating and change-over units 41a and 41b, gate signal generating circuits 42a and 42b, motor control units 43a and 43b, resistance-varying drive motors 44a and 44b, a power source 45, and brushes 18. In FIG. 19, the same reference numerals are used to designate the same or equivalent parts appearing in FIG. 14.

The operation of the compensation current control circuit having the above structure will be described presently.

First, the main circuit current or the armature current $I_m$ is detected by the current detector 37, and the rotation speed N is detected by the rotation detector 38. The output signal from the rotation detector 38, indicative of the detected rotation speed N, is applied to the function generators 39a and 39b for generating pattern signals X and Y which vary in accordance with the rotation speed N as indicated by the preset patterns X and Y respectively in FIG. 17. These pattern signals X and Y are applied to the multipliers 40a and 40b respectively. The output signal from the current detector 37, indicative of the detected armature current $I_m$, is also applied to these multipliers 40a and 40b. Therefore, the pattern signal X is multiplied by the armature current signal $I_m$ in the multiplier 40a to appear as an output signal X', and, similarly, the pattern signal Y is multiplied by the signal $I_m$ in the multiplier 40b to appear as an output signal Y'. These signals X' and Y' are variable according to the respective patterns X and Y which are the function of the rotation speed N and also represent the respective function values proportional to the value of the armature current $I_m$. These signals X' and Y' are applied to the signal discrimination and change-over units 41a and 41b respectively.

As shown in Table 1, these signals X' and Y' have a positive polarity or a negative polarity depending on the direction of the armature current $I_m$, that is, depending on whether the polarity of the armature current $I_m$ is positive or negative. These signals X' and Y' are also variable depending on the direction of rotation, that is, depending on whether the polarity of the rotation speed signal N is positive or negative. The signal discrimination and change-over units 41a and 41b discriminate as to whether the polarity of the signals X' and Y' is positive or negative, and, depending on the discriminated polarity of the signals X' and Y', apply the signals X' and Y' to the gate signal generating circuits 42a and 42b or 42b and 42a respectively by changing over the routes of application.

TABLE 1

| Mode | Direction of current | Direction of rotation | Output from multiplier 40a | Output from multiplier 40b | Input to gate signal generating circuit 42a | Input to gate signal generating circuit 42b |
|---|---|---|---|---|---|---|
| ① | + | + | +X' | +Y' | X' | Y' |
| ② | − | + | −X' | −Y' | Y' | X' |
| ③ | + | − | −X' | −Y' | Y' | X' |
| ④ | − | − | +X' | +Y' | X' | Y' |

When, for example, the signal +X' of positive polarity is applied from the multiplier 40a to the signal discrimination and change-over unit 41a, the output signal or signal X' is applied to the first gate signal generating circuit 42a, as shown in the mode ①. When, on the other hand, the signal −X' of negative polarity is applied to this unit 41a, the output path is changed over, and the output signal or signal X' is applied to the second gate signal generating circuit 42b, as shown in the mode ③. Similarly, depending on the positive or negative polarity of the signal Y' applied from the multiplier 41b to the signal discrimination and changeover unit 41b, the output signal or signal Y' is applied to the second gate signal generating circuit 42b when the polarity of the input signal is positive, and to the first gate signal generating circuit 42a when the polarity of the input signal is negative.

The gate signal generating circuits 42a and 42b apply to the motor control units 43a and 43b the gate signals corresponding to the input signals X' and Y' or Y' and X' respectively, and the motor control units 43a and 43b control the power supplied from the power source 45 thereby driving the resistance-varying drive motors 44a and 44b respectively. Consequently, the resistance values of the shunt resistors 36a and 36b are varied to vary the values of the compensation current $I_{pc}$ supplied to the respective interpole compensation windings 21a and 21b so as to provide the most suitable or optimized magnetic flux distribution.

FIG. 20 shows the practical structure of another current control circuit applied to the embodiment shown in FIG. 14. Referring to FIG. 20, the interpole compensation windings 21a and 21b are not connected in series with each other and are independent of the armature circuit, and the current supplied from the power source 34 (which is a D.C. power source or an A.C. power source) is controlled by independent switching circuits 47a and 47b before being supplied to the interpole compensation windings 21a and 21b respectively. In FIG. 20, reference numerals $42a_1$, $42b_1$; $42a_2$, $42b_2$ designate gate signal generating circuits, and 48a, 48b designate D.C. reactors. Further, in FIG. 20, the same reference numerals are used to designate the same or equivalent parts appearing in FIG. 19. The operation of the circuit shown in FIG. 20 will be described presently.

The function generators 39a and 39b generate pattern signals X and Y varying according to the rotation speed N as indicated by the preset patterns X and Y respectively in FIG. 17. Therefore, the output signals X' and Y' from the multipliers 40a and 40b are variable according to the respective patterns X and Y which are the function of the rotation speed N and also represent the respective function values proportional to the value of the armature current $I_m$. These signals X' and Y' are applied to the signal discrimination and change-over units 41a and 41b respectively. The above steps are the same as those described with reference to FIG. 19.

The signal discrimination and change-over units 41a and 41b discriminate as to whether the polarity of the output signals X' and Y' from the respective multipliers 40a and 40b is positive or negative, and, depending on the discriminated polarity, apply selectively the signals X' and Y' to the gate signal generating circuits $42a_1$, $42b_1$ and $42a_2$, $42b_2$ respectively, as shown in Table 2.

applied to the thyristors $S_1$ and $S_2$ in the individual switching circuits 47a and 47b to turn on-off the thyristors $S_1$ and $S_3$ according to the signals X' and Y'. (In FIG. 21, the means including the commutation circuit for turning off the thyristors are not shown for the sake of simplicity.) In the modes ⑤ and ⑥ in Table 2 in which the filed circuit is switched for reversing the direction of rotation, the thyristors $S_2$ and $S_4$ in the individual switching circuits 47a and 47b participate in the operation for reversing the direction of the compensation current $I_{pc}$ supplied to the interpole compensation windings 21a and 21b. For this purpose, the gate signals from the respective gate signal generating circuits $42a_2$ and $42b_2$ are applied to the gates of the thyristors $S_2$ and $S_4$.

According to the aforemention various embodiments

TABLE 2

| Method of rotation direction switching | Mode | Direction of current | Direction of rotation | Output from multiplier | | Input to gate signal generating circuit | | | |
|---|---|---|---|---|---|---|---|---|---|
| | | | | 40a | 40b | $42a_1$ | $42a_2$ | $42b_1$ | $42b_2$ |
| Normal | ① | + | − | +X' | +Y' | X' | | Y' | |
| | ② | − | + | −X' | −Y' | Y' | | X' | |
| Reverse (armature circuit switching) | ③ | + | − | −X' | −Y' | Y' | | X' | |
| | ④ | − | − | +X' | +Y' | X' | | Y' | |
| Reverse (filed circuit switching) | ⑤ | + | − | −X' | −Y' | | Y' | | X' |
| | ⑥ | − | − | +X' | +Y' | | X' | | Y' |

Suppose, for example, that the direction of rotation of the rotary machine is changed by switching the armature circuit. When the signal +X' of positive polarity is applied from the multiplier 40a to the signal discrimination and change-over unit 41a, the output signal or signal X' is applied to the gate signal generating circuit $42a_1$, while when the signal −X' of negative polarity is applied from the multiplier 40a to this unit 41a, the output signal or signal Y' is applied to the gate signal generating circuit $42a_1$. Similarly, when the signal +Y' of positive polarity is applied from the multiplier 40b to the signal discrimination and change-over unit 41b, the output signal or signal Y' is applied to the gate signal generating circuit $42b_1$, while when the signal −Y' of negative polarity is applied from the multiplier 40b to this unit 41b, the output signal or signal X' is applied to the gate signal generating circuit $42b_1$.

Suppose then the case in which the direction of rotation of the rotary machine is changed by switching the field circuit. In such a case, it is necessary to invert the compensation current $I_{pc}$ supplied to the interpole compensation windings 21a and 21b, and the other pair of the gate signal generating circuits $42a_2$ and $42b_2$ participate in the operation.

Depending on the levels of the signals X' and Y' applied to the gate signal generating circuits $42a_1$, $42b_1$ and $42a_2$, $42b_2$ respectively, the selected gate signal generating circuits generate the corresponding gate signals which are applied to the switching elements in the switching circuits 47a and 47b respectively.

Figure 21:
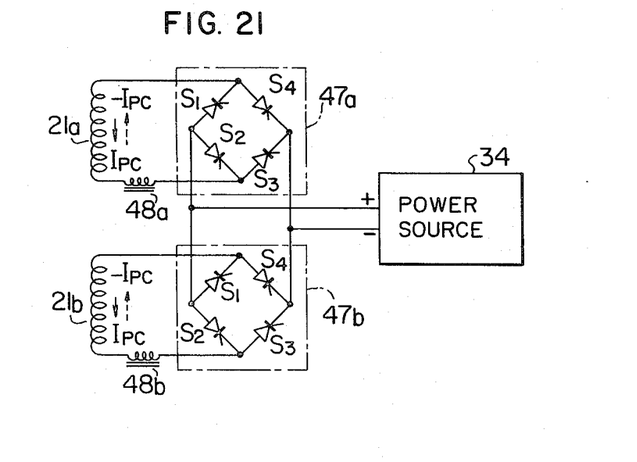
FIG. 21 is a circuit diagram of one form of the switching circuits shown in FIG. 20.

FIG. 21 shows one form of the switching circuits 47a and 47b which employ thyristors as switching elements. (The power source 34 in FIG. 21 is a D.C. power source.) When the compensation current $I_{pc}$ of positive polarity is to be supplied to the interpole compensation windings 21a and 21b, the gate signals generated from the gate signal generating circuits $42a_1$ and $42b_1$ are of the present invention applied to a D.C. rotary machine which is frequently rotated in the normal and reverse directions or in which the regenerative braking or dynamic braking is frequently applied, undesirable non-uniformity of the magnetic flux distribution around the interpole can be minimized regardless of variations of the armature current and rotation speed, and migration of the no-spark zone due to variations of the rotation speed can be completely compensated, so that the commutating emf simulated to the waveform of the reactance voltage can be always generated to improve the commutation performance.

While the aforementioned embodiments have been described with reference to the application of the present invention to a D.C. rotary machine which is frequently rotated in the normal and reverse directions or in which the regenerative braking or dynamic braking is frequently applied, it is apparent that the present invention is in no way limited to such a specific application and is equally effectively applicable to a D.C. rotary machine which is designed to rotate in one direction only or in which the regenerative braking or dynamic braking is not applied.

It will be understood from the foregoing detailed description that the stator of a D.C. rotary machine according to the present invention is featured by the fact that magnetic flux adjusting means is provided adjacent to the radially inner end of the core of the interpole for adjusting the magnetic flux passing through the half of the circumferential width of the interpole core, so that the intensity of the magnetic flux passing through the radially inner end of the interpole core becomes substantially uniform along the end face of the interpole core. By virtue of the provision of such means, the waveform of the commutating electromotive force can be simulated to that of the reactance voltage, and the width of the no-spark zone during commutation can be widened. Therefore, the stator of this kind, when incorporated in a D.C. rotary machine, can exhibit improved commutation performance without the necessity for greatly modifying its original shape or structure.

We claim:

1. A stator of a D.C. rotary machine comprising an annular yoke, a plurality of main pole cores disposed along the inner periphery of said yoke in a relation equally spaced apart by a predetermined distance from each other in the circumferential direction of said yoke, a main pole winding wound around each of said main pole cores, a plurality of interpole cores disposed also along the inner periphery of said yoke at positions intermediate between said circumferentially spaced main pole cores, and an interpole winding wound around each of said interpole cores, wherein magnetic flux adjusting means is provided adjacent to the radially inner end of each of said interpole cores for adjusting the magnetic flux passing through the half of the circumferential width of said interpole core, said magnetic flux adjusting means being formed by disposing interpole compensation windings circumferentially respectively biased toward the opposite sides of said interpole core relative to the circumferential center of said interpole core, each of said interpole compensation windings being supplied with an exciting current in a manner so that the intensity of the magnetic flux passing through the radially inner end of said interpole cores is substantially uniform along the end face of said interpole cores.

2. A stator as claimed in claim 1, wherein said interpole compensation windings are so wound that one of them surrounds one of the side faces of an axially extending slot formed in the circumferentially middle portion of the radially inner end of said interpole core and the associated one of the circumferential side faces of said interpole core, and the other surrounds the other side face of said slot and the associated circumferential side face of said interpole core.

3. A stator as claimed in claim 1 or 2, wherein said interpole compensation windings are wound in in a manner so that the directions of magnetic flux produced by said compensation windings differ from each other.

4. A stator as claimed in claim 1, wherein the exciting current supplied to said interpole compensation windings is derived from the current supplied to said main pole winding.

5. A stator as claimed in claim 1 wherein the exciting current supplied to said interpole compensation windings is dereived from the current supplied to said interpole winding.

6. A stator as claimed in claim 1, wherein means are provided for controlling the exciting current supplied to said interpole compensation windings.

7. A stator as claimed in claim 6, wherein said controlling means controls the exciting current in accordance with the speed of rotation of said D.C. rotary machine.

8. A stator of a D.C. rotary machine comprising an annular yoke, a plurality of main pole cores disposed along the inner periphery of said yoke in a relation equally spaced apart by a predetermined distance from each other in the circumferential direction of said yoke, a main pole winding wound around each of said main pole cores, a plurality of interpole cores disposed along along the inner periphery of said yoke at positions intermediate between said circumferentially spaced main pole cores, and an interpole winding wound around each of said interpole cores, wherein magnetic flux adjusting means is provided adjacent to the radially inner end of each of said interpole cores for adjusting the magnetic flux passing through the half of circumferential width of said interpole core, said magnetic flux adjusting means including interpole compensation windings, each of said interpole compensation windings being disposed across one of said interpole cores and a different interpole core opposite in polarity to said one interpole core, each of said interpole compensation windings being supplied with an exciting current so that the intensity of the magnetic flux passing through a radially inner end of said interpole cores is substantially uniform along the end face of said interpole cores.

9. A stator as claimed in claim 8, wherein each of said interpole compensation windings is so wound as to extend from an axially extending slot formed in the circumferentially middle portion of the radially inner end of said one interpole core to an axially extending slot similarly formed in the circumferentially middle portion of the radially inner end of said different interpole core adjacent thereto.

10. A stator as claimed in claim 8, wherein the exciting current supplied to said interpole compensation windings is derived from the current supplied to said main pole winding.

11. A stator as claimed in claim 8, wherein the exciting current supplied to said interpole compensation windings is derived from the current supplied to said interpole winding.

12. A stator as claimed in claim 8, wherein means are provided for controlling the exciting current supplied to said interpole compensation windings.

13. A stator as claimed in claim 12, wherein said controlling means controls the exciting current in accordance with the speed of rotation of said D.C. rotary machine.

14. A stator as claimed in claim 8, wherein each of said interpole cores is provided with two interpole compensation windings.

* * * * *